June 30, 1953  D. K. CHOWNING  2,643,897
MOTOR VEHICLE FRAME MOUNTING MEANS
Filed Nov. 2, 1951  2 Sheets-Sheet 1
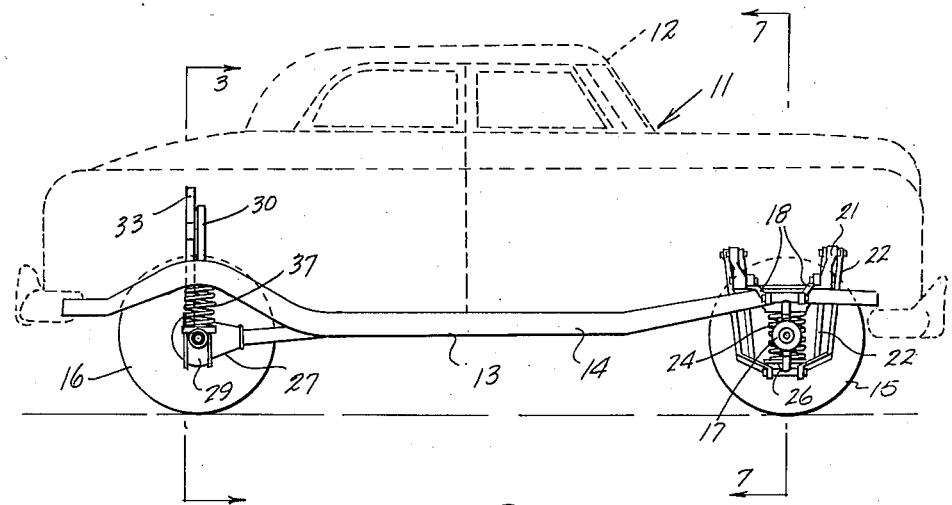
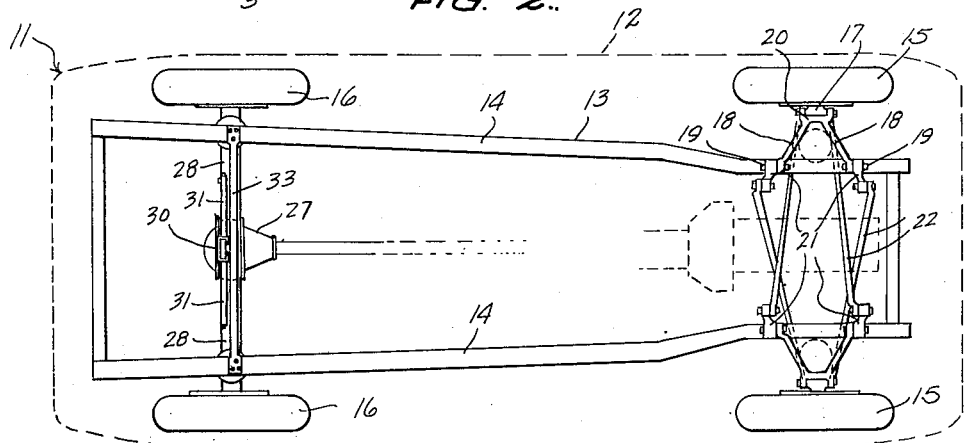
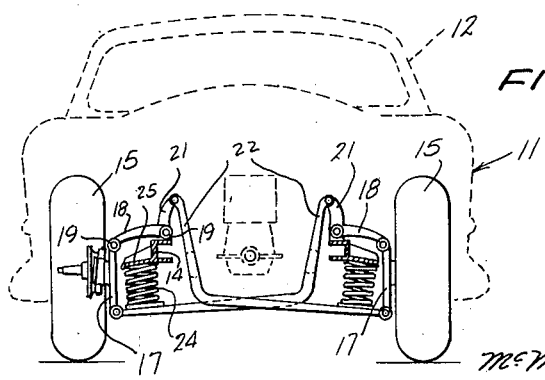
INVENTOR
DALE K. CHOWNING,
BY
McMorrow, Berman + Davidson
ATTORNEYS June 30, 1953
D. K. CHOWNING
2,643,897
MOTOR VEHICLE FRAME MOUNTING MEANS
Filed Nov. 2, 1951
2 Sheets-Sheet 2
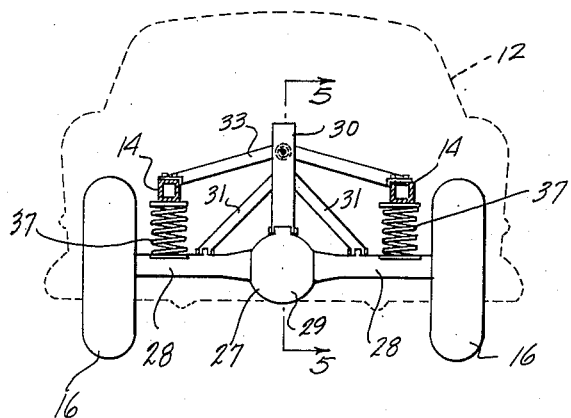
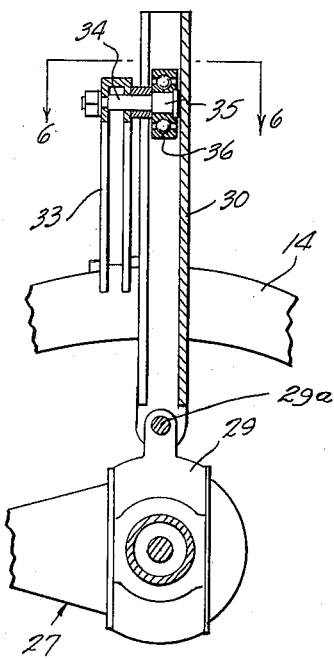
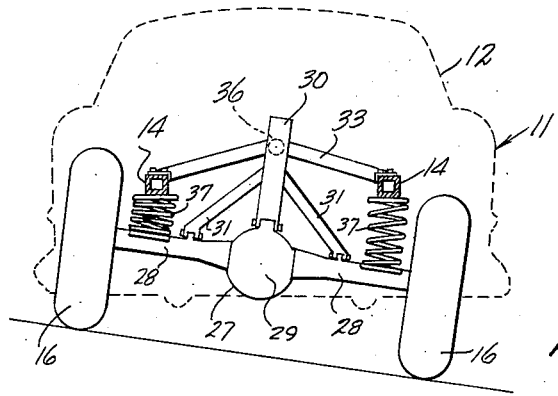
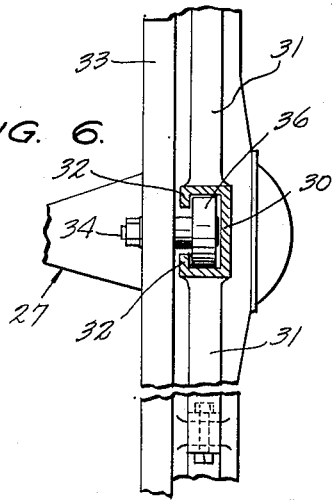
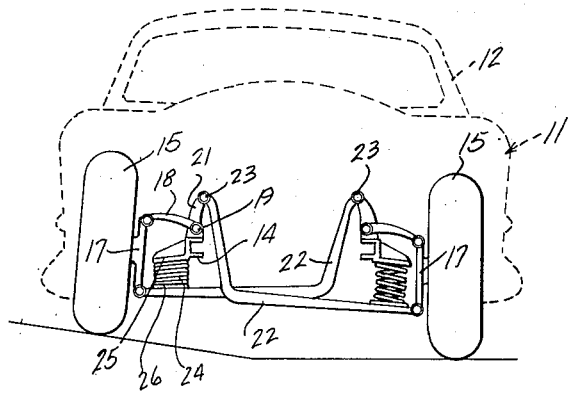
INVENTOR
DALE K. CHOWNING,
BY
McMorrow, Berman + Davidson
ATTORNEYS Patented June 30, 1953

2,643,897

UNITED STATES PATENT OFFICE 2,643,897

MOTOR VEHICLE FRAME MOUNTING MEANS

Dale K. Chowning, Mountain View, Mo.

Application November 2, 1951, Serial No. 254,497

2 Claims. (Cl. 280—112)

This invention relates to mounting means for vehicle bodies, and more particularly to an improved means for connecting the body of a motor vehicle to its wheel supports for eliminating sway of the vehicle.

The main object of the invention is to provide novel and improved vehicle mounting means involving simple components, providing a smooth riding action for the vehicle, and being arranged to eliminate sway which is now experienced in vehicles as the vehicles move around curves.

A further object of the invention is to provide an improved mounting means for connecting the body of a vehicle to its wheel supports, said means being inexpensive to fabricate, being sturdy in construction, and providing improved riding quality for the vehicle, particularly around curves or on inclined roadway surfaces.

Further objects and advantages of the invention will become apparent from the following description and claims, and from the accompanying drawings, wherein:

Figure 1 is a side elevational view of a portion of a motor vehicle frame showing improved means for connecting the frame to the wheel supports of the motor vehicle, the major portion of the vehicle body being shown in dotted view.

Figure 2 is a top plan view of the motor vehicle under frame of Figure 1 showing the connections to the wheel supporting elements of the vehicle, in accordance with the present invention.

Figure 3 is a cross sectional view taken on the line 3—3 of Figure 1.

Figure 4 is a cross sectional view similar to Figure 3 but showing the vehicle on an inclined roadway and illustrating the manner in which the vehicle body pivots relative to the wheel supporting means thereof.

Figure 5 is an enlarged cross sectional detail view taken on the line 5—5 of Figure 3.

Figure 6 is a cross sectional view taken on the line 6—6 of Figure 5.

Figure 7 is a cross sectional view taken on the line 7—7 of Figure 1.

Figure 8 is a view similar to Figure 7 but showing the action of the improved front wheel regulating mechanism of the present invention when one of the front wheels of the vehicle travels on a surface which is inclined to the surface on which the other front wheel travels.

Referring to the drawings, 11 designates a motor vehicle, the main portion of the vehicle being shown in dotted view at 12, the body of the vehicle being provided with an under frame 13 which includes the longitudinal frame bars 14, 14. The front wheels of the vehicle are designated at 15, 15 and the rear wheels of the vehicle are designated at 16, 16.

Each of the front wheels 15 is rotatably mounted on a front wheel supporting member 17, the top portion of said supporting member being connected by link means or a pair of inwardly diverging, substantially straight link arms 18, 18 to the adjacent frame bar 14 by pivotal connections 19, 19, the link arms 18, 18 being rigidly connected together adjacent the top portions of the wheel supporting member 17 by integral bight elements 20, the link arms 18, 18 and the bight elements 20 defining a resultant U-shaped link member. The under frame bars 14, 14 are formed with the integral upstanding arms 21, and the top ends of the respective arms 21 are connected by relatively long L-shaped link bars 22 to the lower portions of the opposite wheel supporting members 17, as shown in Figures 7 and 8, respective pairs of link bars 22, 22 being employed to connect the forward arms 21 to the lower forward portions of the wheel supporting members 17, 17 and to connect the rear arms 21 to the rear lower corner portions of the wheel supporting members 17, 17, as shown in Figure 2. The arms 21 rise upwardly a substantial distance and the connections thereof to the link bars 22, shown at 23, are located above the location of the center of gravity of the body of the vehicle 12. Therefore, when the front wheels 15, 15 encounter surfaces of different elevations, the center of gravity of the vehicle body 12 will tend to swing away from the wheel which is most elevated and the linkages associated with the front wheels will act to maintain said front wheels substantially perpendicular to the surfaces on which said respective wheels are traveling. For example, as shown in Figure 8, when the left hand front wheel 15 is traveling on an inclined surface and the right hand front wheel 15 is traveling on a substantially horizontal surface, the elevation of the left hand wheel 15 being higher than that of the right hand wheel, the linkage connecting the left wheel 15 to the vehicle under frame will tend to cause the left wheel to swing in a clockwise direction, as viewed in Figure 8, whereby the left wheel will assume a position substantially normal to the surface on which it is traveling, whereby most efficient traction will be provided between each wheel and the surface with which it is in contact and there will be no tendency of the vehicle to sway sideways or skid as a result of the different inclinations of the surfaces engaged by the front wheels 15, 15. When both front wheels are traveling on an inclined roadway, the linkages connecting said front wheels to the vehicle frame will act to maintain the front wheels parallel and the center of gravity of the vehicle body 12 will swing in the same manner as above described, whereby the vehicle body will remain horizontal.

The swinging of the vehicle body with respect to the front wheels is cushioned by respective coiled springs 24, 24 secured between flanges 25 formed on the under frame bars 14, 14 and bearing plates 26 secured to the subadjacent link bars 22, 22. From Figure 8 it will be readily apparent that when the vehicle body swings counterclockwise, as viewed in Figure 8, relative to the front wheels 15, 15, the left spring 24 is compressed and the right spring 24 is extended, and a corresponding reverse action takes place when the body 12 swings clockwise relative to the front wheels. The springs 24 are relatively heavy and form effective parts of the respective linkages connecting the front wheel supporting members 17 to the vehicle frame, as well as cushioning the movements of said linkages as the center of gravity of vehicle body 12 swings relative to the front wheels.

The rear wheels 16, 16 are supported on a conventional rear wheel supporting frame structure 27 which includes the respective rear wheel axle housings 28, 28 and the differential housing 29. Connected to the midway portion of the differential housing 29 for rocking movement about an axis transverse of said housing or pin 29a is the lower end of an upstanding channel-shaped guide bar 30, said guide bar 30 being braced and being held in substantially vertical position by respective inclined brace bars 31, 31 connecting the upstanding channel-shaped bar 30 to the respective axle housings 28, 28. As shown in Figure 6, the upstanding channel-shaped bar 30 is formed with the inturned flange elements 32, 32. Designated at 33 is an upwardly bowed cross bar connected at its opposite ends to the under frame bars 14, 14 and located in a transverse vertical plane adjacent to the transverse vertical plane of the upstanding bar member 30. The central portion of the crossbar is connected to the guide bar 33 for vertical movement along the guide bar. Specifically, secured to the center of the cross bar 33 is a pin or bolt 34 having the flanged head 35 projecting into the upstanding bar 30, as shown in Figure 5. Journaled on the head 35 is the roller 36 which is rotatably received inside the channel bar 30 and which is guided thereby for vertical movement. The bolt 34 is located substantially above the location of the center of gravity of the body 12, the upstanding bar 30 rising a substantial distance above the location of said center of gravity. Secured between the longitudinal frame bars 14, 14 and the axle housing members 28, 28 are respective heavy coil springs 37, 37 which cushion the rocking movements of the under frame 13 relative to the rear wheel supporting member 27.

As shown in Figure 4, when the vehicle is traveling on an inclined road surface, as for example when the left rear wheel 16 is at a higher elevation than the right rear wheel 16, as viewed in Figure 4, the left spring 37 is compressed and the right spring 37 is extended, the center of gravity of the vehicle body 12 swinging below the pivot bearing provided by the roller 36 in the channel member 30. It will be apparent that the center of gravity may swing freely around the roller 36 as a bearing and that the body 12 will hence tend to remain substantially horizontal regardless of the inclination of the road surface on which the rear wheels 16, 16 are traveling. The swinging movements of the body 12 are cushioned by the springs 37, 37 whereas the bearing roller 36 is free to move longitudinally in the channel 30 in accordance with varying road conditions.

The combined actions of the rear wheel cushioning and supporting means and the front wheel cushioning and supporting means provide an extremely smooth riding action for the vehicle and effectively eliminate side sway when the vehicle passes around curves.

While a specific embodiment of an improved motor vehicle frame suspension means has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, an under frame including a pair of longitudinal frame bars, a supporting frame structure including a pair of axle housings connected together by a differential housing and carrying a pair of drive wheels arranged transversely of and below said frame bars adjacent the rearward ends of the latter, an upstanding guide bar having the lower end connected to the midway portion of said differential housing for rocking movement about an axis transverse of said housing, a crossbar having each of its ends connected to the adjacent frame bar, the center of said crossbar being bowed upwardly and being above the center of gravity of said under frame, a pin extending transversely through and carried by the center of said crossbar and having one end slidably engaging said guide bar, and a cushioning spring disposed between and operatively connected to each axle housing and the adjacent frame bar.

2. In a vehicle, an under frame including a pair of longitudinal frame bars, a supporting frame structure including a pair of axle housings connected together by a differential housing and carrying a pair of drive wheels arranged transversely of and below said frame bars adjacent the rearward ends of the latter, an upstanding guide bar having the lower end connected to the midway portion of said differential housing for rocking movement about an axis transverse of said housing, a crossbar having each of its ends connected to the adjacent frame bar, the center of said crossbar being bowed upwardly and being above the center of gravity of said under frame, a pin extending transversely through and carried by the center of said crossbar and having one end extending into said guide bar, a roller on said one end of said pin and rollably engaging said guide bar, and a cushioning spring disposed between and operatively connected to each axle housing and the adjacent frame bar.

DALE K. CHOWNING.

References Cited in the file of this patent

UNITED STATES PATENTS

| Number | Name | Date |
|---|---|---|
| Re. 21,091 | Wagner | May 16, 1939 |
| 1,212,987 | Morrow | Jan. 16, 1917 |
| 1,679,853 | Cottin | Aug. 7, 1928 |
| 2,132,963 | Nallinger | Oct. 11, 1938 |
| 2,225,966 | Beemer | Dec. 24, 1940 |
| 2,580,557 | Kolbe | Jan. 1, 1952 |